United States Patent Office 3,122,852
Patented Mar. 3, 1964

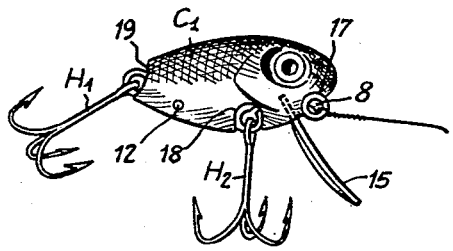
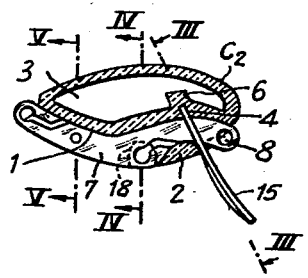
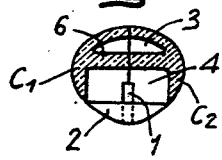
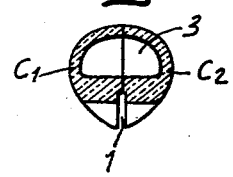
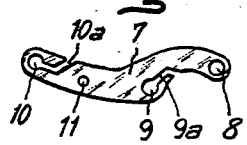
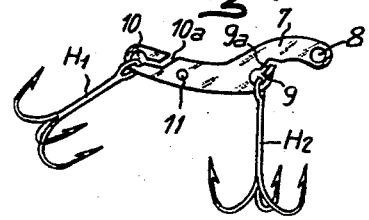
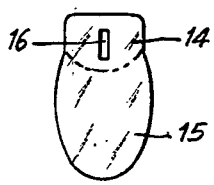
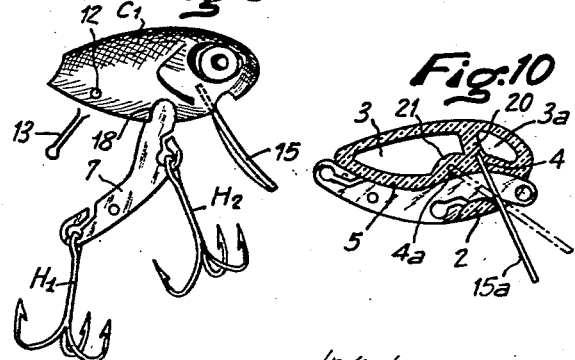
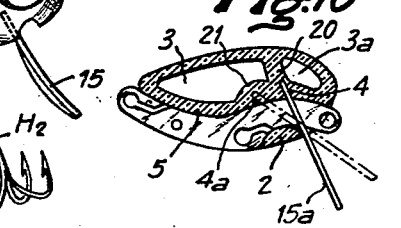
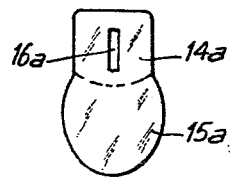

3,122,852
DECOY FISH
Roger Paul Alexandre Bocchino, 44 Rue Liancourt, Paris, France
Filed Nov. 13, 1961, Ser. No. 151,798
Claims priority, application France Dec. 23, 1960
2 Claims. (Cl. 43—42.08)

My invention has for its object a decoy fish and more particularly, a decoy fish provided with a vane which allows it to travel along in a sinuous path and which decoy is so constructed as to permit it to float.

It has also for its object to provide perfect stability for the decoy along its path, a removable character for the fish hook and, optionally, of the vane.

My improved decoy fish includes, according to the invention, in the lower part of its body and along its plane of symmetry, a longitudinal recess forming a trough adapted to carry a small rigid bar carrying at least one removable fish hook and projecting to the front of the body of the decoy fish so as to allow it to be secured to the lower end of the fishing line through an aperture provided in said bar, the body of the fish being designed so as to allow the free movements of the fish hook or hooks and being associated with two stops opposing the outward movement of the small bar, of which stops one at least is removable.

According to a further optional feature of my invention, the body of the decoy fish includes at its front end at least one oblique notch through which may be slidingly engaged the apertured tail-piece of a stationary vane, the aperture in said tail-piece forming a passage for the small bar carrying the fish hook or hooks and acting as a locking means.

Two embodiments of the invention are illustrated in the accompanying drawings wherein:

FIG. 1 is a front elevational view of a first embodiment of a decoy fish according to my invention, said decoy fish being provided with a vane.

FIG. 2 is a sectional view along the plane of symmetry of said decoy fish.

FIGS. 3 to 5 are cross-sectional views respectively through III—III, IV—IV and V—V of FIG. 2 after removal of the vane and of the small bar member.

FIGS. 6 and 7 are plan views of the small bar shown alone and with its fish hook respectively.

FIG. 8 is a plan view of the vane.

FIG. 9 is an elevational view of the decoy fish carrying its vane, while the small bar member is being introduced into its body, said body carrying its securing pin.

FIG. 10 is a view similar to FIG. 2, illustrating a modification of the decoy fish, wherein the vane may occupy two different angular positions corresponding respectively to swimming in deep water and to swimming in shallow water.

FIG. 11 illustrates the corresponding vane.

Both embodiments of the decoy fish described hereinafter are obtained by the gluing together of two symmetrical half-shells or sections C1, C2. In the interest of simplicity, the same reference numbers designate the recesses in each half-shell as well as the housings or chambers defined by the assembly of said half-shells.

In the embodiments illustrated in FIGS. 1 to 9, each half-shell, made preferably of plastic material, is provided, on the one hand, in its lower part, with a recess 1 of a rectangular shape, opening into the lower outline of the fish body, except for the presence of a web 2 forming a sort of boss which is outwardly flush with the surface of the joint between the half-shells while on the other hand, the upper part of the fish body is provided with a closed recess 3 adapted to form a floating chamber. There is also provided in the partition 5 separating the recesses 1 and 3 an oblique cut 4 forming a sort of rabbet as clearly shown in particular in FIG. 3, said rabbet opening into the recess 1 and registering with a projection 6 reinforcing the separating partition 5.

The lower recess 1 is adapted to carry a small bar (FIG. 6), of a similar shape; said bar is provided at its foremost end with an aperture 8 in which may be secured the lower end of the fishing line while its opposite end is provided with an aperture 10 adapted to be engaged by the ring of a fishing hook and its medial section is provided with a third aperture 9, also serving for the engagement of a hook ring.

Each of said apertures 9 and 10 opens into the inner end of a notch 10a—9a formed in the edge of the small bar so as to allow the engagement of the fish hook H1 or H2 (FIG. 7), the outer ends of said notches being closed in the assembled condition of the decoy fish respectively by the partition at the bottom of the recess 1 and by the web section 2 of the body (FIG. 2), which prevents any fortuitous dropping out of the fish hooks.

The bar member is provided furthermore with an aperture 11 adapted to be engaged by a pin 13 (FIG. 9) passing through a port 12 (FIG. 5) extending transversely through the half-shells so as to lock the small bar in a disconnectable manner.

The swimming decoy fish is completed by a vane (FIG. 8) terminating with a tail-piece 14 (FIG. 8) adapted to engage the rabbet-shaped recess 4 and an outer section 15 which is preferably slightly incurved. A rectangular port 16, of a cross-sectional area corresponding substantially to that of the cross-section of the small bar in the plane III—III, allows the introduction of said bar through the vane as will be described with further detail.

The vane 14—15 having engaged the rabbet 4, the bar 7 carrying the fish hooks H1—H2 (FIG. 9), is urged through its front end into the longitudinal recess 1 provided in the body of the swimming decoy so as to reach the immediate proximity of the projection 2, after which it is urged still further so as to pass through the aperture 16 in the tail-piece of the vane and to project at the front end of the fish body. At this moment, the small bar has entirely engaged its recess 1 and the port 11 is located in registry with the apertures 12, which allows threading the pin 13 inside the latter and the port 11 and ensures the desired locking in position. The dismantling is executed through the reverse sequence of steps.

It will be remarked that the body of the fish is provided, on the one hand, in its front section with a semi-cylindrical notch 17 which is substantially coaxial with the location of the aperture 8 in the bar and is adapted to ensure freedom of movement of the decoy fish with reference to the lower end of the fishing line while, on the other hand, a further semi-cylindrical notch 18 is substantially flush with the web 2 and is coaxial with the aperture 9 and, lastly, at the rear end of the decoy fish there is formed a truncated section 19 of an incurved shape. These two notches 18 and 19 have for their object to allow each of the fish hooks to move with sufficient freedom whereby the fish cannot be disengaged when it engages the body of the decoy, without any possible interengagement between the hooks. The notch 17 furthermore shows the advantage of defining immediately and without any difficulty the point to be engaged by the front end of the bar when it is being fitted inside its trough-shaped recess.

In the modification illustrated in FIGS. 10 and 11, the body of the decoy is provided, in an optional manner, with two chambers 3 and 3a separated by a partition 20 in alignment with the cut 4. A second cut 4a registering with a projection 21 in the partition 5, allows giving the vane, either the position engaging the cut 4 as drawn in solid lines, which position corresponds to travel in shallow water or else, the position engaging the cut 4a as drawn in dot-and-dash lines, corresponding to travel in deep water. It will be remarked that the extensions of the recesses 4 and 4a are tangent to the web 2, so that the vane may bear on the latter in both positions.

Said vane distinguishes from that illustrated in FIG. 8 solely through the fact that its tail-piece 14a and the aperture 16a therein (FIG. 11) are longer than in the preceding case, by reason of the greater obliquity given to the blade when in its position ensuring travel in deep water; while the actual vane 15a is shorter.

The change in position of the vane requires, of course, the removal of the pin 13 and the release of the small bar 7.

It should be remarked that the position of the small bar along the lower outline of the decoy fish, provides a ballasting of the decoy which ensures the stability of the latter along its path.

What I claim is:

1. A fishing lure comprising, in combination, an elongated floatable body formed with a longitudinal slot along a lower edge portion thereof, said slot having a top face spaced from said lower edge portion of said body and said body being formed at a rear portion thereof with a bore communicating with said slot and extending transversely to the latter;

a web integral with said body and extending transversely through a front portion of said slot spaced from said top face thereof;

a rigid bar located in said slot and having opposite edge face portions respectively abutting against said top face of said slot and against said web and having a front portion extending through the space between said top face of said slot and said web and being provided at said front end portion with means for attaching a fishing line, said bar being formed with an aperture therethrough aligned with said bore and with a pair of notches respectively extending from said opposite edge face portions rearwardly into said bar one of said notches being arranged in a rear portion and the other in a central portion of said bar, each of said notches having an open end arranged in such a manner that the open end of said one notch is closed by said top face and that of said other notch by a face of said web;

a removable pin extending through said bore and said aperture aligned therewith for releasably securing said bar in said slot; and a pair of fish hooks having each an end portion respectively located in said notches to be pivotally connected to said bar and removable therefrom upon removal of said bar from said slot.

2. A fishing lure comprising, in combination, an elongated floatable body formed with a longitudinal slot along a lower edge portion thereof, said slot having a top face spaced from said lower edge portion of said body, said body being formed at a rear portion thereof with a bore communicating with said slot and extending transversely to the latter and said body being formed with a transverse slot extending at a front portion of said body transversely to said elongated slot and upwardly from said top face thereof into said body;

a web integral with said body and extending transversely through a front portion of said slot spaced from said top face thereof;

a rigid bar located in said slot abutting against said top face thereof and against said web and having a front portion extending through the space between said top face of said slot and said web and being provided at said front end portion with means for attaching a fishing line, said bar being formed with an aperture therethrough aligned with said bore;

a vane having an upper portion extending into said transverse slot and a lower portion extending forwardly of said web abutting thereagainst beyond said lower edge portion of said body, said vane being formed intermediate said upper and lower portions thereof with an elongated aperture through which said front portion of said bar extends to removably secure said vane to said body;

at least one fish hook removably and pivotably secured to said bar; and a removable pin extending through said bore and said aperture aligned therewith for releasably securing said bar in said slot.

References Cited in the file of this patent

UNITED STATES PATENTS

| | | |
|---|---|---|
| 1,522,450 | Hayes | Jan. 6, 1925 |
| 2,044,702 | Kalyn | June 16, 1936 |
| 2,127,639 | Breuer | Aug. 23, 1938 |
| 2,190,791 | Larson | Feb. 20, 1940 |
| 2,234,439 | Larson | Mar. 11, 1941 |
| 2,570,100 | Collins | Oct. 2, 1951 |
| 2,587,736 | Kindscher | Mar. 4, 1952 |
| 2,612,716 | Hedland | Oct. 7, 1952 |
| 2,883,785 | Croft | Apr. 28, 1959 |

FOREIGN PATENTS

| | | |
|---|---|---|
| 476,966 | Canada | Sept. 18, 1951 |